Aug. 6, 1968  W. E. FUNK ETAL  3,395,896
APPARATUS FOR TREATING SOIL
Original Filed March 28, 1966  4 Sheets-Sheet 1
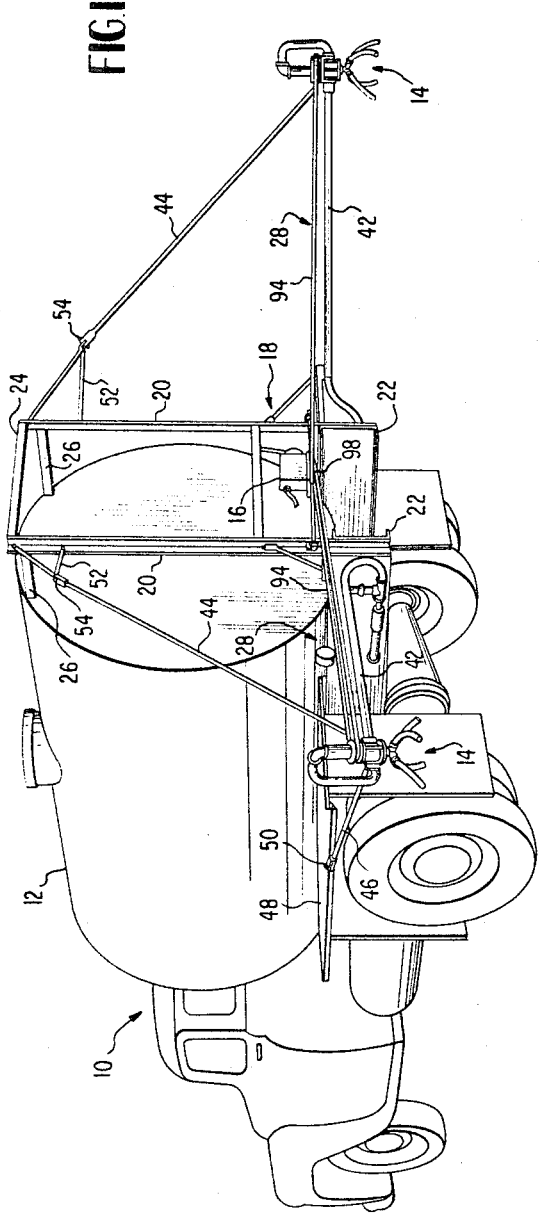
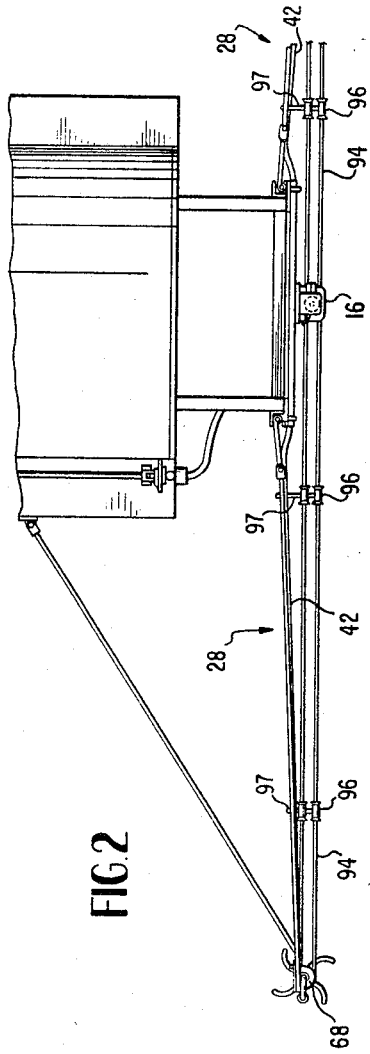
INVENTORS
WILLIAM E. FUNK
IRVIN H. LEHMAN
BY
LeBlanc + Shur
ATTORNEYS

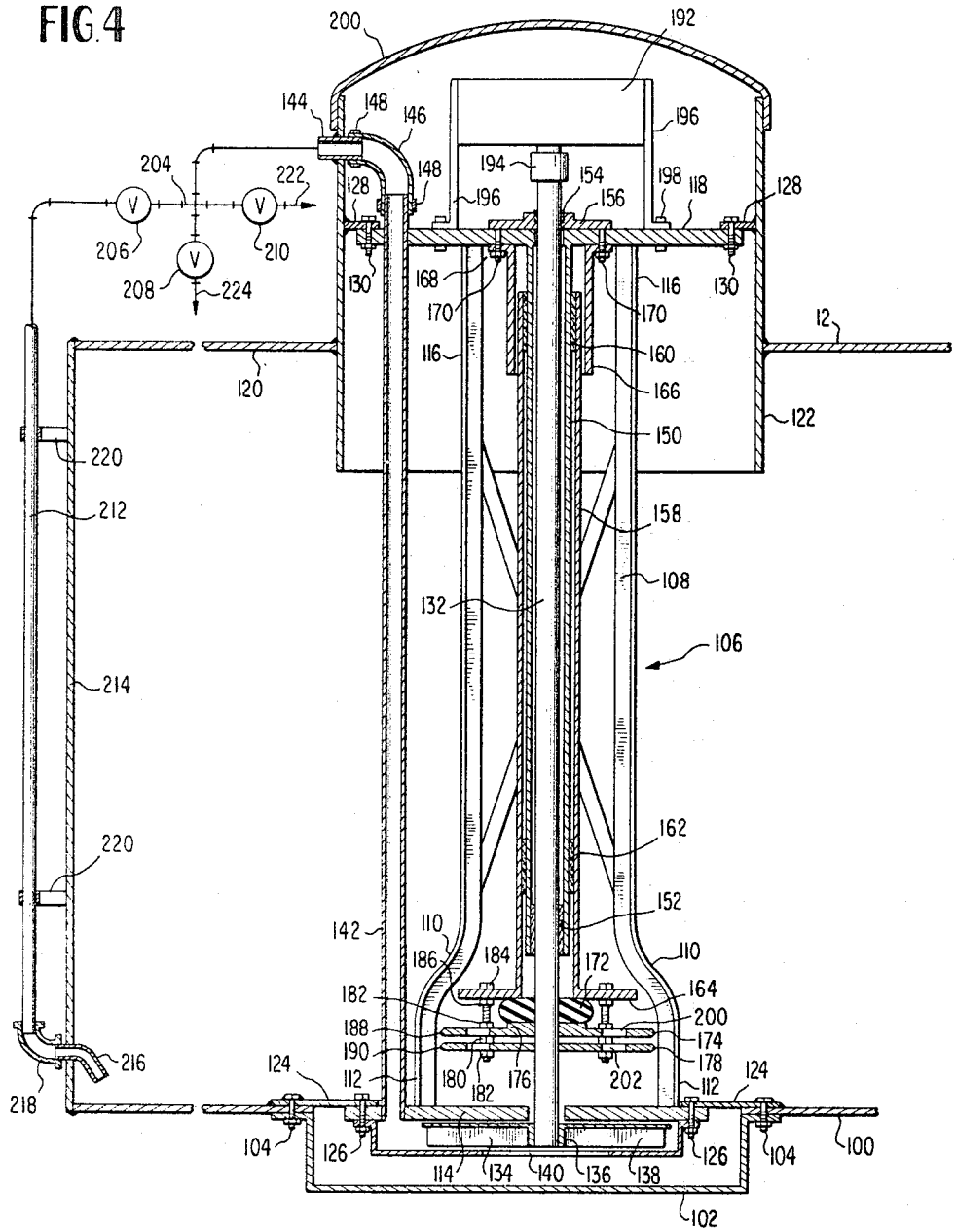

INVENTORS
WILLIAM E. FUNK
IRVIN H. LEHMAN
BY
ATTORNEYS

United States Patent Office 3,395,896
Patented Aug. 6, 1968

3,395,896
APPARATUS FOR TREATING SOIL
William E. Funk, 504 E. Dunlap St., and Irvin H. Lehman, 310 E. Allen St., both of Kentland, Ind. 47951
Original application Mar. 28, 1966, Ser. No. 537,772, now Patent No. 3,351,287. Divided and this application Nov. 14, 1966, Ser. No. 606,482
16 Claims. (Cl. 259—96)

ABSTRACT OF THE DISCLOSURE

The soil treating apparatus comprises a vehicle with a container mounted thereon and having a mixing and pumping unit for respectively forming a viscous slurry and delivering the same from the container to a plurality of applicators carried by the vehicle. The mixing and pumping unit comprises an impeller mounted at the lower end of a shaft journalled on bearings within an encompassing tube. The second tube encloses the first tube and the shaft and carries a pair of mixing plates at its lower end directly above the impeller. A compressible seal is disposed between the open lower end of the second tube and the mixing plates whereby the bearings mounting the shaft are not exposed to the slurry.

---

This application is a division of copending application Serial No. 537,772, filed Mar. 28, 1966, now Patent No. 3,351,287, which is a continuation-in-part of applications S.N. 210,720 filed July 18, 1962, now abandoned, and S.N. 158,010 filed December 10, 1961, now abandoned.

The present invention relates to the treatment of soil, as by fertilizers or biocides, and more particularly relates to improved methods and apparatus for carrying out such soil treatment.

Fertilizers, in a broad sense, include all materials that are added to soils to increase the growth, yield, quality, or nutritive value of crops. However, the meaning of the term is commonly restricted to apply to artifically prepared materials containing plant nutrients. As is well known, considerable effort has been expended in the fertilizer field to provide chemical fertilizer ingredients to supply or restore plant nutrients in soils. As an example, a corn crop yield of 100 bushels per acre will remove from the acre of soil in a single growing season about 95 pounds of nitrogen, 45 pounds of phosphate, and 30 pounds of potassium oxide. Thus, simply to rehabilitate the soil to its prior condition, it is necessary to restore these amounts of the three essential nutrients, and also in many instances trace minerals. Moreover, particularly when a crop has been raised in a field for several years running, the soil may become infested with worms, parasites, etc. and it is frequently desirable to apply pesticides, fungicides and other biocides.

Heretofore, dry liquid and gaseous fertilizers and biocides of a wide variety have been proposed varying from single ingredient fertilizers, such as liquid ammonia, to compositions of all essential nutrients and certain quantities of biocides. In practically all cases, multiple field applications have been required, either to supply the nutrients and/or biocides separately, or to supply them in adequate quantities.

While solid or dry fertilizers may be provided in a high analysis form and may include trace minerals, the handling of such fertilizers from manufacture to application involves certain well known inconveniences or disadvantages. Liquid fertilizer is a solution containing one or more water-soluble forms of nutrients and presents certain advantages as compared to dry fertilizers. These advantages include the saving of labor in handling where pumps and pipes can be used, their convenience as foliar sprays, and the convenience of adding pesticides. One of the main drawbacks to liquid fertilizer, however, is the relatively low grade or low analysis that may be provided without introducing salting out problems in comparison with solid fertilizers. One way to cope with this problem is the use of superphosphoric acid. Unfortunately, however, the superphosphoric acid loses much of its beneficial effect on solubility if there is much potash in the solution.

These difficulties with high analysis liquid fertilizers led to experimentation with suspension type fertilizers using sequestrants and suspending agents. However, while this permits the use of higher analyses, other drawbacks are introduced. For one, a water solution of superphosphate is quite acidic and therefore very corrosive to equipment. The pH can be raised by ammoniation, but this converts the superphosphate to ammonium phosphate and insoluble dicalcium phosphate. Formation of the latter increases the quantity of solids to be carried in suspension and therefore reduces the allowable concentration as compared with suspensions made from phosphoric acid. Settling also poses problems, but perhaps the most serious obstacle to the adoption of suspension type fertilizers has been the difficulty of applying thick, viscous slurries containing a relatively high crystal content. As a result of these difficulties, while the theoretical advantages of suspension type fertilizers have been appreciated, they have not been commercially used to any known extent prior to the present invention.

According to the present invention, it has now been found possible to realize the theoretically potential value of suspension type fertilizers through the use of unique apparatus which permits the application of the fertilizer by means of a new process. According to this process suspension type fertilizers having an analysis so high as to render them heavy and viscous are subjected to a mixing action in a container, are removed from the container by means of positive pressure, preferably a positive action pump, and are thence fed through relatively large conduits to one or more rotating applicators capable of distributing the slurry fertilizer at the desired speed and concentration in a uniform manner.

According to the invention, these applicators consist of power driven rotating slinging devices which literally throw or sling the heavy viscous material in the form of discrete globules which settle in a uniform pattern. Contrary to conventional liquid fertilizer procedures, the hydrostatic pressure of the fertilizer is not relief upon either to broadcast the fertilizer or to impart a spinning motion to nozzles. As a matter of fact, nozzles in the conventional sense of restricted size orifices at the point of expulsion are deliberately avoided as it has been found that such constructions are unsatisfactory.

According to the invention, improved uniform spreading and application is brought about through the use of a movable truck or other suitable conveyance carrying one or more rotary application devices in the form of slingers, each of which includes a plurality of elongated adjustable distributor pipes or tubes having their terminal axes set at various preselected angles so as to simultaneously broadcast the soil treating material over areas of substantially different diameters. According to one feature of the invention at least two such slingers are utilized with the individual pipes and tubes in each slinger adjusted (in accord with the speed of rotation of the slingers) to achieve a more uniform distribution of fertilizer over substantially the entire swath covered as the vehicle moves.

It is a feature of the invention that the high corrosivity of the high analysis slurry material is effectively combatted through the use of a mixing and pumping arrangement which eliminates bearings or couplings which are submerged in contact with the slurry or which extend through. Another important feature of the invention is the discovery that "salting out" at the openings of the slinger tubes, with the concomitant possibility of ultimate stoppage, may be effectively prevented by forming the slinger tubes of a plastic material or at least of a composite material having an overall coefficient of heat transfer which is considerably lower than that encountered in metal conduits.

According to the invention, the heavy viscous slurry is subjected to a mixing action prior to application, and also during the time that the slurry is being transported from the point of formation to the point of application. The slurry is preferably contained in a tank or other container mounted on a vehicle such as a truck wherein the power for creating the mixing action and the power for pumping the slurry to the applicators is provided by the power plant of the vehicle. With such an arrangement it has been discovered that it is possible to utilize a fertilizer plant wherein the tank on the truck constitutes the container in which the slurry is formulated. This permits the elimination of a very considerable amount of equipment previously required in fertilizer plants and makes complete automation of the fertilizer formulation possible.

According to the invention, the flow of the slurry is maintained in relatively large conduits avoiding small orifices and thin film flow over relatively large areas. That is to say, it has been found that when operating with high analysis slurry the use of small orifices or thin films of flowing slurry, particularly exposed thin films, produces clogging, sedimentation and an ultimate disruption in operation. To the extent possible, the unit is designed so that any gravity flow which occurs after cessation of operation tends to clean or empty the distributor or applicator rather than causing collection of slurry therein which will harden, cause a build-up of solids or crystals, and clog the unit. Under actual operating conditions, the slurry in the unit is either under agitation or mixing or is in a relatively fast moving flow so that sedimentation or settling is minimized.

It is another feature of the invention that the area of distribution may be relatively accurately controlled over rather wide ranges in such a manner as to minimize dispersal and drifting of the fertilizer during broadcasting. That is to say, a wide variation in the size of the pattern may be obtained without projecting the fertilizer upwardly into the air in a manner which very substantially increases drifting and dispersal due to wind and which substantially interferes with the uniformity of the pattern and the deposition of discreet globules which adhere to the soil. It has been found that this may be accomplished along with an unexpectedly facile control of uniformity of distribution and area of pattern where the distributors or applicators constitute plural rotatable conduits in a tubular or pipe-like form, with each tube or conduit being independently adjustable such that the terminal axes of the conduits are movable into positions which generate approximately the surfaces of portions of cones having their axes disposed downwardly from apex to base, with all such cones being rotated about a common axis.

In order to achieve maximum versatility and to accomplish all of the objects of the invention, the speed of the vehicle, speed or throughput of the pump, speed of rotation of the distributors, adjustment of the individual conduits in the distributors are independently variable, such that a change in one does not automatically result in a change in the other.

Another feature in the invention is the incorporation of a mixing and pumping device capable of being started even after severe settling or even partial freezing of the contents of the fertilizer tank. In order to obtain and maintain maximum and uniformity of the slurry, and in order to avoid settling in parts of the tank remote from the pump, without the use of stirring devices extending through large areas of the tank, a recirculation system is utilized which, along with a slurry flow control in the conduit to the distributors, permits the pump and mixer to operate at a relatively high speed to maintain uniform mixing and uniformity of the slurry and relatively high pump efficiency.

It has been found however that a particularly efficacious distribution apparatus for heavy slurry soil treating material is achieved by using with the plural rotatable conduit type distributors described herein a system wherein the slurry type soil treating material is mixed in a tank, delivered from that tank under pressure by a pump, and then, just prior to entering the distributors, passed through a flow control orifice which is formed of a nonmetallic material, preferably a synthetic resin such as Teflon. The apparatus may be so designed that the nonmetallic orifice is readily replaced with orifices of different size to thereby provide a very effective control of the volume of soil treating material delivered to the distributor. Using such an arrangement it is possible to maintain a relatively high pump speed and therefore achieve efficient pump operation. According to other embodiments of the invention, the pump shaft, operating at such a high speed, can be utilized to drive a mixer and while operating at such high speed and delivering a relatively high output pressure or throughput, can also supply recirculating lines. The pressure in the slurry material is considerably higher on the upstream side of the orifice than on the downstream and in the preferred embodiment of the invention, simply moves directly downwardly from the orifice into the plural rotatable conduits which are driven in order to sling or throw the heavy slurry material in the desired patterns. It is a feature of the invention that the combination of distributor and nonmetallic orifice may be provided as a unit with the nonmetallic orifice mounted at the inlet end of a vertical conduit system which feeds the rotating conduits.

It is accordingly a primary object of the present invention to provide an improved process and apparatus for treating soil.

It is another object of the invention to provide such an improved process and apparatus which permits the highly economical use of viscous suspension type fertilizers of high analysis which may contain trace elements, fungicides, pesticides and other biocides.

It is another object of the invention to provide a manner of realizing the theoretically potential value of suspension type fertilizers through the use of a unique apparatus and method for handling the fertilizing material from preparation to application.

It is another object of the invention to provide a method of treating soil with suspension type fertilizers having an analysis so high as to render them heavy and viscous by subjecting the fertilizers to a mixing action; removing the fertilizer from the container by means of a positive action pump, and thence feeding the fertilizer through relatively large conduits to one or more applicators capable of a wide degree of adjustability as to pattern of fertilizer distributed, uniformity within the pattern, and nature of the particles distributed.

It is another object of the invention to provide a method of treating soil with suspension type fertilizers as described above, wherein the application of the fertilizer is accomplished by a power-driven rotating slinging device which is supplied with the slurry at a high and substantially constant rate and literally throws or slings the heavy viscous fertilizer in the form of discrete globules which settle in a uniform pattern adjustable to an accurate degree.

It is still another object of the invention to provide a means of realizing the theoretically potential value of suspension type fertilizers in the manner previously described wherein the high corrosivity of the material is effectively combatted.

It is still another object of the invention to provide a manner of realizing the theoretically potential value of suspension type fertilizers through a method and apparatus of the foregoing type wherein the slinger tubes are formed of a plastic material or at least of a composite material having an overall coefficient of heat transfer which is considerably lower than that encountered in metal conduits and are independently adjusted to achieve uniformity of distribution over a wide range of areas.

It is another object of the invention to provide apparatus for realizing the theoretically potential value of suspension type fertilizers by imparting a mixing to the fertilizer, removing the fertilizer from the container by means of a positive action pump, feeding the fertilizer at a high rate through relatively large conduits to one or more applicators, and rotating such applicators at variable rates and at varying adjustments to secure uniform distribution over a selected area.

It is another object of the invention to provide a method and apparatus for treating soil by means of suspension type fertilizers wherein the fertilizer may be carried by means of a truck, tractor or aircaft.

It is another object of the invention to provide a method and apparatus for applying suspension type fertilizer to soil without the necessity of utilizing a suspending agent such as colloidal clay.

It is another object of the invention to provide a method and apparatus for applying suspension type fertilizer to soil wherein the rate of application of the fertilizer may be accurately and uniformly controlled by means of an inexpensive addition to a conventional conveying vehicle.

It is another object of the invention to provide an improved apparatus and method for applying suspension type fertiilzer to soil wherein the application is carried out by means of a plurality of power-driven rotating sling devices mounted on foldable booms carried by a vehicle with the rotating slinging devices driven by a central power source and wherein the slinging devices are so disposed as to minimize interference with the distribution pattern by the vehicle and its wheels.

It is another object of the invention to provide an improved apparatus and method for applying suspension type fertilizer to soil wherein the application is carried out in such a manner as to permit accurate control of both the area and uniformity of distribution while at the same time minimizing dispersal and drifting of the fertilizer during application.

It is another object of the invention to provide an improved apparatus and method for applying suspension-type fertilizer to soil through the use of distributors or applicators rotating about a substantially vertical axis and including plural rotatable conduits in a tubular or pipelike form, with each tube or conduit being independently adjustable so that the terminal axis of the conduits are movable into positions which generate approximately the surfaces of portions of cones having their axes disposed downwardly from apex to base, with all such cones being rotated about the aforesaid substantially vertical axis.

It is another object of the invention to provide an improved apparatus and method for applying suspension-type fertilizer to soil as described aforesaid wherein the speed of the vehicle, speed or through-put of the pump, speed of rotation of the distributors, adjustment of the individual conduits in the distributors are independently variable such that a change in one does not automatically create a change in the other.

It is another object of the invention to provide an improved apparatus and method for applying suspension-type fertilizer to soil wherein the application is carried out by means of a traveling container having installed therein a mixing and pumping device capable of being started even after severe settling or even partial freezing of the contents of the container.

It is another object of the invention to provide an improved apparatus and method for applying suspension-type fertilizer to soil wherein the application is carried out from a transportable tank having an associated pump and mixer, wherein the output of the pump feeds a recirculation system which permits the pump and mixer to operate at relatively high speed to maintain uniform mixing and uniformity of the slurry and relative high pump efficiency.

It is still another object of the invention to provide an apparatus for applying soil-treating materials to soil comprising a vehicle with a container mounted thereon and having a mixing means for forming a viscous substantially uniform slurry of the soil treating materials in the container means, the unit being provided with applicator means for applying the slurry to the soil wherein the applicators comprise at least one rotatable device having a substantially vertical conduit and a plurality of additional conduits connected to the vertical conduit and extending in directions other than vertical and with ends extending in still different directions, the difference between the directions of the ends and the other portions of each of said additional conduits being substantially greater than 90°, with the entire vertical and additional conduits being rotated under power to apply slurry delivered thereto by centrifugal force, the slurry being delivered thereto by a conduit connected to the container and associated with a pressure producing means to ensure a flow in the conduit at a rate greater than that which would be produced by gravity.

It is another object of the invention to provide an improved apparatus and method for applying suspension-type fertilizer to soil and adapted to be carried by a vehicle and receive slurry fertilizer under pressure, wherein the apparatus comprises a substantially vertical slurry receiving conduit having a plurality of tubular conduits adjustably connected thereto with outer ends having terminal axes that are movable relative to the axis of the vertical conduit into positions lying approximately along portions of the conical surfaces of cones having axes which extend from apex to base downwardly relative to the axis of the vertical conduit.

It is another object of this invention to provide an apparatus for applying slurry type soil treating material utilizing a container and at least one applicator for applying the material, wherein the applicator constitutes a rotatable device having a substantially vertical conduit portion carrying a plurality of adjustable additional conduit portions having terminal axes extending downwardly at different angles to the substantially vertical conduit portion, with means for rotating the applicator to apply slurry delivered thereto by centrifugal force, and with conduit means connecting the applicator to the container, the slurry being handled by a pumping device associated with the conduit means between the container and applicator, and a slurry flow control means associated with the applicator in association with the vertical conduit whereby the pressure and slurry flowing through the vertical conduit to the additional conduits is lower than the pressure of slurry flowing through the conduit to the flow control means.

It is still another object of the invention to provide an apparatus for applying soil treating materials and adapted to be mounted in a container for such materials, wherein the apparatus comprises a combined pump and mixer having a substantially vertical shaft with a pump impeller at the lower portion of the shaft and with mixing means carried by the shaft above the impeller but also at the lower portion thereof, the shaft being held by support means carried by bearings rotatably suspending the shaft means from the support means, and with further means for preventing the treating materials from reaching the bearings.

It is another object of the invention to provide an apparatus and method for applying slurry type soil-treating material utilizing a combined pumping and mixing apparatus disposed in a container for such materials wherein the pump and mixer are driven by a common shaft, rotate at a relatively high speed, and are so constructed as to prevent the slurry material from gaining access to the bearings.

It is still another object of the invention to provide an apparatus for applying slurry type soil treating materials utilizing a combined mixer and pump of the foregoing type which is simple in construction, adapted to be driven by a conventional hydraulic or electric motor and readily mounted in containers for such soil-treating material.

It is still another object of the invention to provide an apparatus of the foregoing type which is relatively low in cost and durable so as to minimize maintenance expenses.

It is still a further object of the invention to provide an apparatus and method for distributing slurry fertilizer comprising a tank and at least one power driven rotating distributor having plural distributor conduits of a material other than metal, with delivery of the slurry to the distributor through an orifice of a material other than metal.

It is still a further object of the invention to provide an apparatus and method for distributing slurry fertilizers through the use of at least one driven centrifugal force distributor which receives fertilizer from a pump through an orifice immediately upstream of the distributor.

These and further objects and advantages of the invention will become more apparent upon reference to the following specification and claims and appended drawings wherein:

FIGURE 1 is a perspective view of a truck mounted embodiment of a device constructed according to the present invention and capable of carrying out the method of the invention;

FIGURE 2 is a partial plan view of the rear end of the apparatus of FIGURE 1;

FIGURE 4 is a partial vertical section through the tank of the apparatus of FIGURE 1 showing details of the preferred mixing and pumping arrangement;

Figure 3:
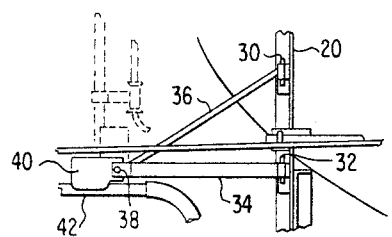
FIGURE 3 is a partial elevational view of the mode of attachment of the distributor supporting booms to the rear of the apparatus of FIGURE 1.

Referring more particularly to FIGURES 1 and 2 of the drawing, there is seen in FIGURES 1 and 2 a preferred embodiment of the invention utilizing a conventional flatbed truck 10 as the conveying vehicle. It will be understood, of course, that other conveying vehicles may be utilized, such as a trailer adapted to be pulled by a truck or farm tractor or the like. Alternatively, the apparatus may be provided with a tank and booms suitable for carrying by an aircraft.

Referring to FIGURE 1, the apparatus consists of a container or tank 12 in the form of a large cylindrical drum mounted in a horizontal position on the truck 10. The tank 12 contains the suspension or slurry which may be pumped by a pumping device (not shown in FIGURES 1 and 2) to the distributing or applicator heads indicated generally at 14. The power source for rotating the distributors or applicators 14 is indicated generally at 16 and is carried by a frame generally indicated at 18 (FIGURE 1). The frame 18 consists of a pair of vertical angles 20 welded or otherwise secured to a pair of rearwardly extending channels 22 carried by the truck 10. The upper ends of the angles 20 are cross braced by means of an angle 24 and are secured to the rear of the tank 12 by brackets 26.

A pair of double-articulated booms generally indicated at 28 are carried by the vertical angles 20 in a manner best seen in FIGURES 1, 2 and 3. Referring to FIGURE 3, each boom is attached to its vertical angle 20 by a pair of upstanding pins 30 and 32 which are welded or otherwise secured to the angles. A bracket 34 is pivotally mounted on the lower pin 32 while a diagonal bracket 36 is pivotally attached to the upper pin 30. The lower ends of the brackets 34 and 36 are joined, as by welding, and are pivoted at 38 to a mounting block 40 movable from the horizontal position shown in FIGURE 3 in solid lines to the vertical position shown in that figure in broken lines. The mounting block 40 has secured thereto by any suitable means such as welding, the inner end of a pipe 42 which extends horizontally outward from the truck when in the extended position, as best seen in FIGURES 1 and 2.

Pivotally attached to the outermost ends of the pipes 42 are a pair of diagonally upwardly extending positioning rods 44 and inwardly extending rods 46 (FIGURE 1). The other end of the rod 46 is secured to the flat bed 48 of the truck in a removable manner as by means of the bolt 50. The upper end of the rod 44 is removably secured to a bracket 52 as by means of a bolt 54. The bracket 52 is welded or otherwise secured to the upper end of the vertical angle 20.

Figure 6:
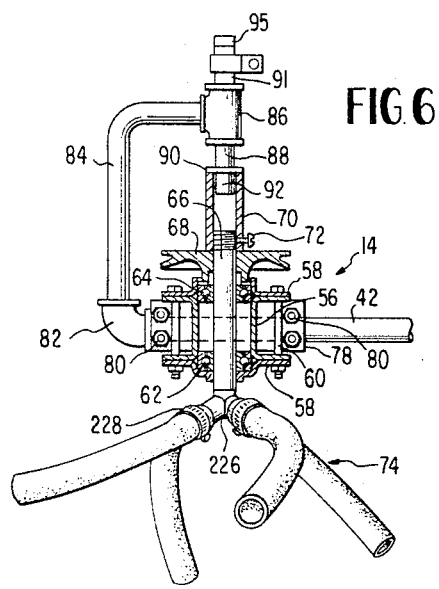
FIGURE 6 is a vertical section of the distributor or applicator showing the internal construction.

Referring to FIGURE 6, the distributor or applicator heads consist of a bearing housing 56 having end caps 58 secured thereon by bolts 60. The bearing housing and end caps carry a pair of roller bearings 62 and 64 which rotatably support a vertical pipe 66. The upper end of the vertical pipe 66 carries a pulley 68 and screw threadedly engages a coupling 70. A lockscrew 72 may be utilized to secure the coupling 70 in position. The lower end of the vertical pipe 66 terminates in four oppositely and downwardly extending distributor pipes indicated generally at 74, presently to be discussed in further detail.

Still referring to FIGURE 6, an attachment bracket 78 is affixed to the housing 56, as by welding, and the entire distributor head 16 is supported on the pipe 42 by means of a pair of U-bolts 80 secured to the attachment plate 78. The outer end of the pipe 42 terminates in an elbow 82 which is attached to a bent pipe 84. The other end of the pipe 84 is attached by a T-coupling 86 to an inlet pipe 88 having a flange 90 and an end 92 entering the coupling 70. The fit between end 92 and the inner wall of coupling 70 is such as to permit relative rotational motion therebetween as the vertical pipe 66 is driven by the pulley 68.

Figure 7:
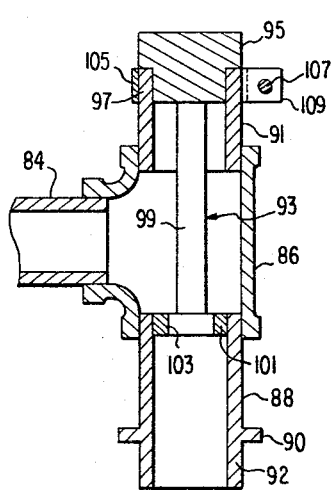
FIGURE 7 is a vertical section through the inlet coupling at the top of the distributor of FIGURE 6.

Referring now to FIGURE 7, it is seen that the T-coupling 86 carries at its upper end a short pipe section 91. Extending down into the pipe section 91, T-coupling 86 and inlet pipe 88 is an orifice fixture generally indicated at 93. The orifice fixture 93 comprises a solid cylindrical plug 95 having a reduced diameter section 97 received within the upper end of pipe section 91. Downwardly depending from diametrically opposite sides of plug 95 are a pair of legs 99 which support a washer-like orifice plate 101. The plate 101 has a central orifice 103 which is utilized to regulate the flow of slurry to the applicators or distributors.

While one of the classic difficulties encountered in attempted distribution of slurry fertilizer has been the clogging encountered in using nozzles, we have unexpectedly found that, such clogging is avoided if the orifice used in the environment and arrangement disclosed herein is formed of a non-metallic material, preferably a plastic material such as Teflon. Thus, according to the invention, the orifice fixture 93 is formed of Teflon or an equivalent. The fixture is removably secured in position by means of a hose type clamp 105 held in position by means of a screw and nut assembly 107 associated with ears 109. The pipe section 91 is also formed of a plastic material to permit of this tightening, polyvinyl chloride being a suitable material, although other equivalent pipe plastics can also be used. By loosening the screw and nut assembly 107, it is possible to withdraw the plug 95 and orifice assembly. Different orifice assemblies may then be substituted, having different orifice diameters to provide adjustability in the flow of the unit.

It is to be noted that the orifice is disposed immediately upstream of the distributors, a feature which has been found to provide a reliable control of fertilizer flow. It has been found that if the orifice is placed in the conduit leading to the distributor at a point relatively far removed from the distributor, the downstream pressure existing from the orifice to the distributor may vary to a sufficient degree to interfere with accurate flow control. That is to say, when the orifice is a relatively long distance from the distributor, the flow subsequent to the orifice may encounter sharp edges of elbows, bends in the line, or other protuberances or recesses which may interfere with the accuracy of metering obtained through the use of the orifice. In particular, where plural distributors are utilized, placement of orifices far upstream of the distributors does not produce uniform distribution from similar distributors where such sharp edges, bends, protuberances, etc. in the various conduits are not precisely the same. With the orifice immediately upstream of the delivery to the distributor, the quantities discharged cannot vary because all restrictions have been removed.

Referring to FIGURES 1 and 2, the distributor heads 14 are positively driven by means of belts or chains 94 which are reaved around the pulleys or sprockets 68 and are guided toward the truck body by eyelets 96 supported by suitable brackets 97 from the pipes 42. The inner end of the belts or chains 94 are reaved around pulleys or sprockets 98 driven by the hydraulic motor 16. The hydraulic motor 16 may be driven from the engine of the truck or a power takeoff and is provided with a speed control throttle, not shown.

Referring now more particularly to FIGURE 4, there is shown a vertical cross section through the center of the tank 12 showing the combined mixer and pump of the invention mounted in position. The bottom 100 of tank 12 is provided with a sump pan or dish 102 secured thereto in any suitable manner, such as by bolts 104. The combined pump and mixer is indicated generally at 106 and comprises four vertical frame angles 108 belled outwardly at 110 and having lower ends 112 attached to a base plate 114 in any suitable manner, such as by welding. The upper ends 116 of frame angles 108 are attached to an upper plate 118 in any suitable manner, such as by welding.

Mounted within an opening in the upper side 120 of tank 12 is a cylinder 122. The pump-mixer unit is secured in the tank both at the top and at the bottom, being secured at the bottom by means of brackets 124 which are fastened to base plate 114 as by bolts 126. The brackets 124 are fastened to the bottom 100 of the tank 12 by the heads of the bolts 104 and also by welding. The heads of the bolts 104 are preferably welded to the brackets 124 so that the sump dish or pan 102 may be readily removed from the outside of the unit. The upper end of the pump-mixer unit is fastened to the cylinder 122 by means of brackets 128 welded to the inside of the cylinder and by means of bolts 130 attached to upper plate 118.

The upper plate 118 and base plate 114 are apertured to receive a main shaft 132 which carries at its lower end a pump impeller 134 shown in detail in FIGURE 5. As may be seen, the impeller 134 has a hub 136 for securement to the lower end of the shaft 132, as by a set screw 133 and key, or the like, and is provided with impelling vanes 138. Beneath the impeller 134 is mounted a pump pan 138 having a central pump intake aperture 140. The pan 138 is flanged and secured in position as by means of bolts 126 or the like. Extending upwardly from the left side of the pump casing formed by pan 138 and base plate 114 is an outlet pipe 142 which passes through the upper plate 118 and which is coupled to a nipple 144 by means of a flexible tube or hose 146 and the usual hose type clamps 148. Nipple 144 is welded or otherwise secured in the cylinder 122.

Depending from the underside of the upper plate 118 is a support tube 150, the tube 150 being welded or otherwise secured to the plate 118. The main shaft 132 is journaled in the support tube 150 by means of lower bearing 152 and an upper bearing 154 carried by a cap 156. The bearings 152 and 154 are non-metallic, being of a conventional bushing type formed of either wood or impregnated fibre.

Disposed on the outside of support tube 132 is a mixer blade support tube 158 which is journaled on similar non-metallic bearings 160 and 162 on support tube 150. The lower end of the mixer blade support tube 158 terminates in an outwardly extending flange 164. The upper end of the mixer blade support tube 158 extends into the recess provided by a downwardly extending guard tube 166 having a flange 168 secured to the upper plate 118 as by bolts 170 which may be welded at their upper ends to the cap 156 so as to simultaneously secure cap and tube 166 in position.

The lower end of the mixer blade support tube 158 is sealed to the main shaft 132 by means of an apertured ball 172 of latex rubber or the like. The ball is compressed into a sealing disposition by means of the mixer blade 174 which has an increased thickness central portion 176 in engagement with the lower surface of the ball. A lower mixer blade 178 is mounted below the upper blade 174 by means of spacer tubes or bolts 180, bolts 182 and screws 184 fastened to flange 164 by bolts 186. By pulling the blades 174 and 178 tightly up against the lower surface of the ball 172 it is compressed into the shape illustrated in FIGURE 4 wherein a seal is established between the main shaft 132 and the lower end of the mixer blade support tube 158 to prevent the entry thereinto of slurry fertilizer or other material in the tank 12. In order to prevent splashing of the same into the tube 158, its upper end extends into the guard tube 166 as previously described, whereby the bearings 152, 154, 160 and 162 are protected from contact with the material being handled by the unit. The peripheral edges 188 and 190 of the mixer blades 174 and 178 are preferably bevelled which has been found to improve the operation of the unit. It is to be noted that the mixer blades are immediately adjacent the pump, an arrangement which has been found particularly and unexpectedly effective.

The mixer-pump unit may be driven by means of a hydraulic motor 192 coupled to the main shaft 132 by means of a conventional coupling 194. The motor 192 may be mounted on the upper plate 118 by means of brackets 196 and bolts 198. The hydraulic supply lines to the motor 192 are led out through the sidewall of the cylinder 122 to the source of hydraulic fluid (not shown). The cylinder 122 is closed by any suitable cover such as that illustrated at 200.

The mixer plates 174 and 178 are provided with aligned apertures 200 and 202 to create the mixing action. In a specific embodiment, the plates 174 and 178 are each provided with eight openings arranged in a circle about the shaft 132.

In a specific embodiment of the mixer-pump of FIGURE 4, the pump impeller 134 is eight inches in diameter, the mixer blades 174 and 178 are seven inches in diameter, the apertures 200 and 202 are ¾-inch in diameter, the spacing between plates 174 and 178 is 5/16-inch, the diameter of the outer tube 158 is 2 inches, and the distance from base plate 114 to upper plate 118 is 28 inches, with the remaining dimensions of the mixer pump unit shown in FIGURE 4 being generally to scale. It will be appreciated that the height of the frame angles 108, shaft 132 and tubes 150 and 158 may be varied to suit the inside diameter of the tank.

With the unit described and shown, wherein the bearings are protected from the slurry fertilizer and the mixing plates are provided in the manner shown, a minimum of bearing difficulty has been encountered. While the theoretical analytic reason for this has not been completely established, it is believed that the operation of the combined mixing-pumping unit at a relatively high speed utilizing the flat mixing plates 174 and 178, with bevelled edges, provides a type of gyroscopic effect which minimizes bearing difficulties. It has been found that without the mixer, the fertilizer unit gives trouble in operation.

It is a feature of the invention that to aid the mixer-pump unit in performing its function a means is provided for preventing sedimentation or "build-up" of solids at those portions of the tank removed from the mixer and particularly at bottom corners of the tank. To this end, the output of the pump through output pipe 142 and nipple 144 is connected to a four-way coupling 204 which in turn is connected to three flow control valves 206, 208 and 210. The valve 206 is connected via pipe 212 mounted on the end 214 of the tank 12 to a scouring nipple 216 by means of the elbow coupling 218. The scouring nipple is preferably directed downward in the tank such as at the 45° angle shown. The pipe 212 may be secured to the end 214 of the tank in any suitable manner, such as by means of brackets 220. The valve 210 is similarly connected by means of a pipe 222 to a scouring nipple at the opposite end of the tank (not shown). The third valve 208 is connected by means of a pipe 224 to a manifold (not shown) which feeds the pipes 42 which are connected to the distributors. Preferably this manifold is located at a lower elevation than the distributors but in their vicinity. Thus, when the unit is shut down, fluid from the distributors flows back into the manifold and there is then a minimum of delay time between startup of the unit and distribution. This is a marked advantage inasmuch as it has been found that with units without such a manifold, where slurry fertilizer had to flow by gravity to the distributors, there was at times 50 to 60 feet of travel of the unit before distribution commenced thereby leaving an unfertilized spot.

Returning to a consideration of the unit as illustrated in FIGURE 4, and recalling the fact that the distributor heads 14 are provided with orifices 103, it is a feature of the invention that the pump may be run fast to provide good mixing and gyro effects thereby minimizing bearing problems. The bearings themselves need no seal in the arrangement shown as they are not operating in the slurry fertilizer, thereby eliminating erosion and clogging problems. Recirculation occurs through the valves 206 and 210 and pipes 212 and 222 and scouring nipples 216 to not only permit operation of the pump at a relatively fast speed and high thruput, but also to scour the ends of the tank of material which would tend to settle or sediment. In actual operation, recirculation plus the use of the orifices permits the pump to be run at substantially constant and relatively high speed in the range of 750–1500 r.p.m. The pump normally operates at about 10 p.s.i. output pressure and with open throttle and a large orifice delivers approximately 125–150 gallons per minute. The pump flows utilized in actual operation range from approximately 25–150 gallons per minute utilizing orifices ranging from ⅜ to 1 inch inside diameter. As specific examples, with the pump operating at 1200 r.p.m. and producing an output conduit pressure of 10 p.s.i. the following poundages of fertilizer may be distributed:

| Truck Speed, m.p.h. | Orifice Diameter, inch | Fertilizer Distributed, lbs./acre |
|---|---|---|
| 10 | ⅜ | 300 |
| 10 | ½ | 400 |
| 10 | ⅝ | 500 |
| 10 | ¾ | 600 |
| 10 | 1 | 800 |

As stated, it is important that the orifices be made of a non-metallic material such as Teflon in order to prevent a buildup of slurry and ultimate clogging of the system. The use of the combined mixer and pump allows the unit to start even though there has been a considerable settling of the slurry and the impeller of the pump and the blades of the mixer are to a large degree in solid material.

Referring now back to the distributor head shown in FIGURE 6, it will be seen that attached to the bottom end of the vertical pipe 66 is a coupling 226 having four downwardly angled outlet nipples on which are mounted the distributor pipes 74. The distributor pipes 74 are formed of a non-metallic material having a coefficient of heat transfer lower than that of a metal and are preferably formed of polyvinyl chloride pipe which, in a specific example, has a ⅞-inch inside diameter and 10-inch length. As will be seen from FIGURE 6, the pipes 74 are bent through a gradual curve so that the terminal axis of the pipe is at an angle to the axis of the pipe at the point of attachment to the coupling 226. The pipes 74 are connected to the coupling 226 by heating the plastic material so that it becomes soft, forcing the pipes onto the nipples on the coupling so as to expand the coupled ends, and allowing the plastic material to harden. The pipes are then adjustably secured into position by means of clamps 228 in the nature of hose clamps which may be released to allow adjustment of the individual pipes with respect to the downwardly directed nipples on the coupling 226. With this type of mounting of the pipes on the coupling, and with the uniform curvate angle in the pipes, it has been found that considerably less breakage is encountered than with prior devices, such as those disclosed in parent applications Serial Nos. 282,729 and 210,720. With these older units it was found that in sub zero temperatures the distributor pipes tended to break upon a minor impact, such as striking a standing corn or weed stalk. On the other hand, the distributor arrangement illustrated in FIGURE 6, constructed of gradually curved plastic pipes mounted in the manner shown, strike only a glancing blow to such an obstacle and do not break. Further, it is believed that the adjustment of the tension in the conduit by means of the hose type clamp and mode of attachment of the pipe to the nipple allows the pipe to give rather than break.

Figure 8:
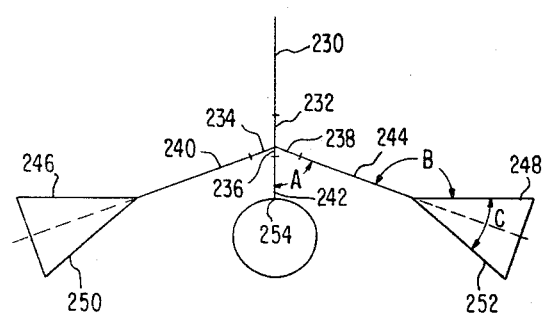
FIGURE 8 is a diagrammatic illustration of the variation in adjustment in the terminal axes of the distributor or applicator conduits or tubes which is provided by a specific embodiment of the invention.

As will now be explained, the angle in the nipples of coupling 226 and the angles in the pipes 74 constitute important concepts of the invention in that they provide for a wide adjustability of distribution of material from the applicators in a manner which is completely under control of the operator and which may be made highly uniform. Referring now to FIGURE 8, there is shown a diagrammatic illustration wherein only certain axes of the various parts of the distributor 14 are illustrated. Thus, there is shown at 230 the axis of the vertical pipe 66; at 232 the axis of the vertical portion of the coupling 226; at 234, 236 and 238 the axes of three of the depending nipples, the terminal axes generates cones as indicated be being directly behind axis 236; axes 240, 242 and 244 corresponding to the axes of the connected or upper portions of the pipes 74, and at 246 and 248 the axes of the terminal portions of two of the pipes 74 in their uppermost positions of adjustment. When the clamps 228 are loosened and the pipes 74 rotated about the nipples of the coupling 226, the ends of the pipes move through an angle. Referring to FIGURE 8, when the upper end axes 240 and 244 of these delivery pipes are rotated about their nipples, the terminal axes generate cones as indicated between the uppermost portions of the terminal axes 246 and 248 and the lowermost positions 250 and 252. In a similar manner, the terminal axes 254 of the center discharge pipes define similar cones which appear as ellipses in FIGURE 8.

According to the invention it is desired that the uppermost positions of the terminal axes of the distributor pipes preferably do not rise above the horizontal inasmuch as this causes a lofting of the fertilizer material with a concomitant tendency toward blowing and dispersal under windy conditions. It has been found that unexpected results are achieved when the angle A between the axes of the nipples and the vertical is equal to the angle B between the nipple axes and the uppermost position of the terminal axes, less 90°; and if the angle C, the included angle in the cone, is equal to one-half the difference between 180° and the angle B. To state these relationships in equation form:

$$A = B - 90; \quad C = \frac{180 - B}{2}$$

According to the invention the angle B should be 145–165° and preferably 150–160; the angle A should be 55–75° and preferably 60–70°; and the angle C should be 30–70° and preferably 40–60°. The bend in the delivery pipe should be smoothly curvate with the minimum radius of curvature approximately midway of the ends of the pipes. The straight portion of the pipe defining the terminal axis should be at least one-third the total length of the pipe.

Figure 5:
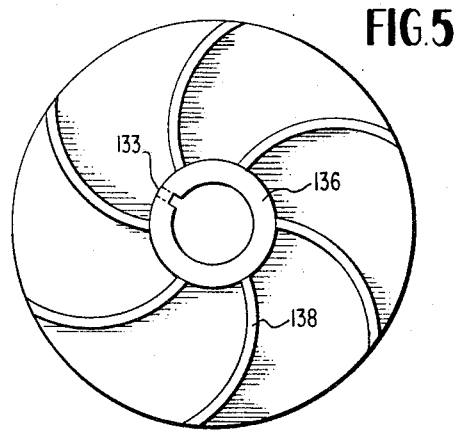
FIGURE 5 is a bottom view of the impeller of the pump in the apparatus of FIGURE 3.

An advantageous feature of the distributor construction is the large degree of accuracy provided in the setting of the individual pipes. That is to say, movement of the terminal axis from 246 to 250 or from 248 to 252 involves a rotation of the axes 240 or 244 through a full 180°, which is the degree of rotation utilizable in adjustment of the distributor pipes. In actual practice, the four distributor pipes of FIGURE 5 are ordinarily adjusted so that their terminal axes are disposed different angular distances from the vertical, to provide circular throw patterns of the desired radii. The advantages to be obtained by this arrangement will now be described.

Figure 9:
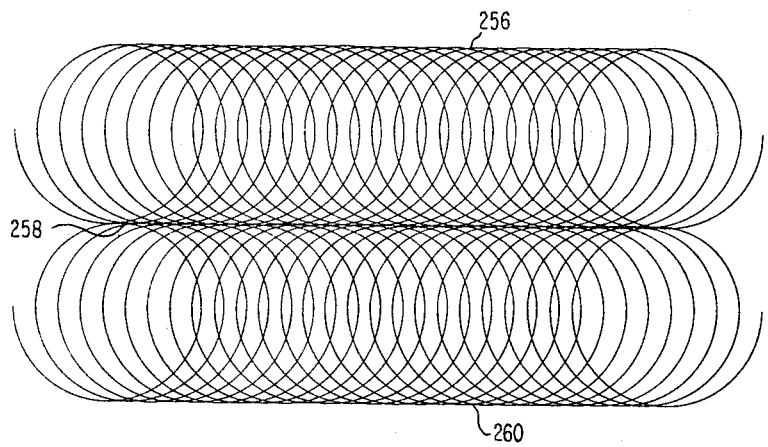
FIGURE 9 is a schematic plan view of soil after treatment with two distributor pipes or conduits set at the same angle.

FIGURE 9 ilustrates the pattern of material applied to the soil by a single pipe 74 on the two distributor heads 14 of FIGURE 1 with the pipes of both distributor heads set at the same angle. As the distributor heads are rotated and the slurry applied thereto under positive pressure, the slurry is subjected to centrifugal force in an outward direction and is discharged or broadcast from the distributor pipes 74. The distributor pipes may be of any desired number but four are preferred. As can be seen in FIGURE 9 when the pipes on the two distributors are set at the same angle so as to describe concentric circles of equal diameter for both distributor heads, a large percentage of the fertilizer is deposited in three strips labeled 256, 258 and 260 in FIGURE 9. The pattern for only two pipes is shown for simplicity but it is understood that with four pipes per distributor the concentration at the center and along the edges is even greater since each pipe covers these areas. The center strip 258 is almost twice as dense as the other strips 256 and 260 due to the partial overlap of the two distributors which is almost inevitable if the distributors are set to insure that no area of the soil is missed. Furthermore, the center strip 258 is several times the density of the application to the areas intermediate the adjacent strips so as to produce fertilizer distribution which is not uniform over the area of the soil traversed by the equipment.

FIGURE 10 on the other hand illustrates a much more uniform distribution where all portions of the area covered by the distributors receive substantially an equal amount of soil treating material. Each of the discharge pipes 74 on each of the distributors is set at a different angle so as to describe concentric circles of different diameters and which due to the motion of the vehicle appear as the respective spirals 262, 264, 266 and 268 in FIGURE 10. While different angles may be chosen to meet the specific application it has been found that a particularly even pattern is obtained if the individual pipes of a distributor are set such that the diameters of the patterns 262, 264, 266 and 268 are respectively 4 feet, 8 feet, 12 feet and 16 feet. It has further been found that the length of the adjustable pipes 74 should be at least 8 and preferably 10 inches for proper distribution.

The mixer and pump with its provision for recirculation produce a vigorous mixing action which has been found to maintain a uniform dispersion of finely divided solid particles, prevent settling out of solids, subvert or nullify crystal growth, etc., so that the thick, heavy, viscous slurry of soil treating materials is maintained at a consistent analysis and fine texture without the necessity for a suspending agent. On the other hand, attapulgite clay may be used, if desired, and is frequently utilized with the heavier formulations.

The speed of rotation of the distributors, plus the adjustment of the angles of the terminal axes of the discharge pipes, also has an effect upon the size of globules of slurry fertilizer which is broadcast. In certain instances it is desirable to have these globules larger or smaller, depending upon the particular crop involved, such as wheat, oats, barley or grass which generally take the smaller type globules. These crops need to have the fertilizer applied for a uniform broadcast adjacent to the root system of the plant. In other situations, it is advantageous to have the slurry applied in larger globules by setting the conduits at wider angles and turning at slower speed, such as on windy days where the larger globules are less likely to be subject to wind drift after striking the soil and will adhere to loose soil and be subject to less wind erosion in large globule form. This is particularly advantageous for fall or winter applications where the material will be left standing for several weeks or months. An illustration of relatively large globules as they adhere to the soil according to the unique apparatus and method of this invention is illustrated in FIGURE 11.

To recapitulate, the slower the distributors turn, the larger the globules. Where the spinners do not turn at all, the slurry material is simply delivered in four streams (although the unit is not used in this manner). The other extreme is that of a very high r.p.m. wherein the material is dispersed in quite small globules. By adjusting the angular position of the terminal axes of the distributor pipes in relation to the speed of the spinner, a predetermined quantity can be evenly spread over any desired swath width from 12 inches to 20 feet. The rotating distributors will uniformly apply the slurries regardless of the size of any material lumps as long as they remain smaller than the orifice of the conduit, which in a preferred embodiment has an inside diameter of ⅞ inch. The heaviest of slurries can be distributed without being subject to clogging. When the distributor pipes are formed of polyvinyl chloride or a similar low coefficient of heat transfer plastic, curved in a smooth arc, slurry fertilizers, especially those containing a high percentage of ammonia nitrate ingredients, do not build up in the discharge tubes even in sub-zero weather. This is to be contrasted with the clogging which occurs when metal tubes are utilized even though they have the same large inside diameter.

The operation of the invention and apparatus of the invention is as follows: The various individual raw ingredients are formulated directly within the tank 12 to provide substantially any soil treating composition desired. The mixer and pump are set into operation with full recirculation, i.e. with valve 208 closed and valves 206 and 210 open. There is introduced into the tank through an enlarged opening in its upper surfaces the following: liquid nitrogen solution comprised of aqua ammonia, commercial nitrogen solution and/or urea solutions depending upon the desired analysis, the manner of distribution and climactic conditions, the desired phosphorus constituent which may be comprised of comminuted dry rock phosphates, comminuted dry triple superphosphate and/or phosphoric acid (particularly crude grade wet process acid), the preferred material being comminuted triple superphosphate; and finally the desired quantity of potash. As alternatives to pre-formulated nitrogen solutions, water and anhydrous ammonia may be used, anhydrous ammonia may be added to liquid constituents, and the individual parts of the ultimate solution may be introduced individually into the tank.

As the materials are introduced into the tank and during the time that they are in the tank they are mixed such that they form a thoroughly mixed, uniform, fine dispersion of all of the ingredients. Crystal growth in subverted or nullified and a high analysis viscous slurry having a high solid to liquid ratio is readily formulated. One of the advantages of the method and apparatus is that it permits use of the least expensive raw materials available in the particular area.

By way of example, the following are practical, economical formulations for making directly in the apparatus of FIGURE 1, five tons each of complete fertilizers having the analyses of 18–9–12 and 4–12–24, respectively.

18–9–12

|  | Lbs. |
|---|---|
| Nitrogen solution (31.4% N) (6.3% anhydrous ammonia nitrate) (13.9% liquid urea) | 5725 |
| Triple superphosphate (46% $P_2O_5$) | 1950 |
| Muriate of potash (red or white) (62% KCl) | 1935 |
| Water | 390 |

4–12–24

| Aqua ammonia (24% N) | 1670 |
|---|---|
| Triple superphosphate (46% $P_2O_5$) | 2610 |
| Muriate of potash (red or white) (62% KCl) | 3870 |
| Water | 1850 |

This capability for manufacture of formulation of soil treating slurries directly in the tank results in the advantages that cheaper materials may be used, solutions having greater amounts of free ammonia are now practically usable, liquid acid is not necessary, sequestering is eliminated and costly batching plants are no longer essential. In this latter respect, batching plants may be replaced by simple storage facilities for nitrogen solutions, anhydrous ammonia, comminuted dry phosphates and potash, as shall presently be described. If desired, the facility could also include storage tanks for relatively small quantities of crude wet process phosphoric acid. The ingredients may be transported individually in bulk by conventional trucks from a storage facility to a field to which the ultimate slurry is to be applied, and the ingredients may be mixed on the site. If the field is small, i.e., such as twenty acres, the distributor truck pictured in FIGURE 1 may be supplied with the basic ingredients directly at the storage facility and utilized to transport, mix and distribute the soil treating slurry.

As a further alternative, mixer trucks equipped with a reservoir, an agitator and means for transferring the agitated slurry from its tank to the tank of a distributor may be utilized as the transporting vehicle. In this case, the means for transferring the slurry from the transport truck to the distributor truck may take the form of the pump shown herein for feeding the slurry to the distributor heads or the mixing tank may comprise an air-tight reservoir and the transferring means may comprise air under pressure supplied by a compressor mounted on the mixer trucks. Obviously, several raw material transports or mixer trucks may be used to afford a continuous supply of slurry for a distributor located many miles from the storage facility. In any of these various arrangements, the mixing and pumping assembly is preferably continuously operated as the raw materials are put into the tank and during the time they are in the tank.

In the mixing operation, the use of triple superphosphate is recommended as it reacts sufficiently with the nitrogen solution to produce a certain amount of heat, but not as much heat as is produced in the reaction between liquid acid and the nitrogen solution. This heat is very beneficial in assisting to maintain a uniform dispersion of the high solids content of the slurry. As an alternative, the phosphorous constituent may be provided by a combination of comminuted rock phosphate and wet process acid to afford substantially the same advantage. In either event, the cost of the phosphate component is considerably less than heretofore considering that wet process acid costs about seven and one-half cents per pound, triple superphosphate about six cents per pound, and rock about four and one-half cents per pound. Thus, the process of the invention results in a saving of at least about one and one-half cents per pound of the phosphorous constituent, which amounts to about sixty-five cents per acre in savings. This, coupled with the savings afforded by use of lower cost nitrogen solutions and elimination of the cost and overhead of latching plants affords an ultimate saving of well over one dollar per acre to the farmer.

According to the preferred embodiment of the invention, the tank has a sufficient capacity to accommodate the amount of slurry required for at least a few acres at application rates in the order of 100–2000 pounds per acre. The tank of FIGURE 1 is approximately five feet in diameter, twelve feet long, and has a capacity of one thousand gallons, i.e., about five to seven tons of slurry.

After the tank is loaded with the desired ingredients, it is transported, as by the truck shown in FIGURE 1, to the site of application and it is important that the agitator be operated during this transportation. It has been found that the transportation causes a more rapid settlement and segregation of the ingredients than standing and the mixing action prevents this during the transportation.

In addition, the operation of the mixing arrangement in transit permits the truck to remain at the loading site for only a short period of time with the mixing being accomplished during transportation. During such transportation to the site of application, the booms 28 are articulated inwardly by disconnecting the rods 44 and 46 and pivoting the booms into an upright position as shown in phantom in FIGURE 3. When rotated into this position, the construction of the unit permits easy disengagement of the chains 94 from the sprockets 98, the loose ends of the chains being hung in the frame at the back of the tank during transit. After the truck reaches the site of application, the booms are extended and the positioning rods 44 and 46 bolted into position in the manner shown in FIGURES 1 and 2. In this process, the chains 94 are reengaged with the sprockets 98, the pump is rendered operative, as by a suitable value in its hydraulic supply line, and the unit is ready for operation. Cab controls may be provided for the distributor head drive motor 16 and for the pump and mixer drive motor 192.

According to the invention, the pumping pressure of the liquid is not primarily relied upon to control the area of broadcasting but rather is utilized as one means of controlling the pounds per acre of soil treating composition which is applied. As opposed to spray type liquid fertilizer distributors, the distance which the streams of liquid are ejected from the distributor heads is not controlled by the liquid pressure since the diameter of the distributor pipes in the distributor head are quite large so that very little hydrostatic pressure is available for creating the orifice effect obtained with spray type applicators. Indeed, it is a feature of the invention that the liquid is supplied to the distributor heads at a hydrostatic pressure far below that which would create the area of broadcasting which is obtained through the use of the power driven distributor heads.

It is another feature of the invention that in order to obtain proper operation of the unit and method, the slurry must be fed to the distributor heads at a greater rate of flow than that which would be produced by gravity alone, the pump providing this flow rate. The operating speed of the distributor heads is preferably about 200–400 r.p.m. in order to produce the desired results.

As the distributor heads are rotated and the slurry applied thereto at the rate previously described, the slurry is subjected to centrifugal force in a generally horizontal direction and is discharged or broadcast from the distributor heads through the adjustable outlet pipes 74. The distributor pipes may be two or four or more in number but four pipes have been found preferable.

Figure 11:
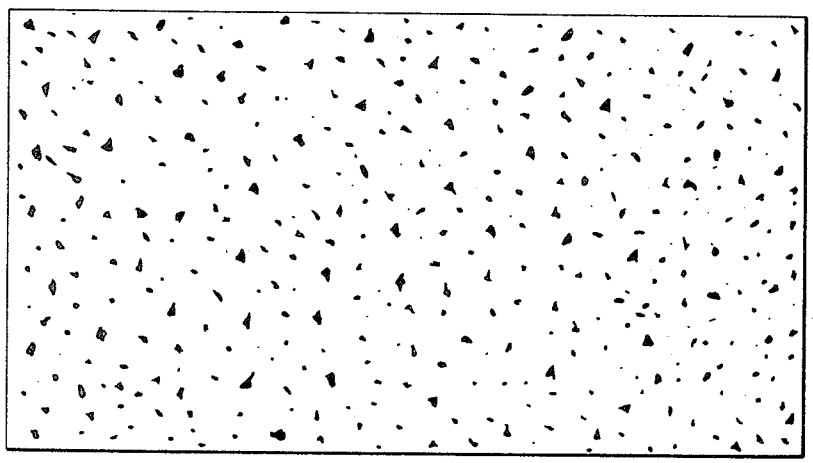
FIGURE 11 is a schematic representation in plan view of soil subsequent to distribution of treating composition by the apparatus depicted in FIGURES 1 through 5.

By varying the spacing of the distributor heads 16 above ground level, varying the angle of the adjustable pipes 74 and/or varying the speed of distributor head rotation, substantially any desired pattern in size and area of distribution may be obtained. Head height may be varied from about two feet to about six feet (or higher where aircraft application is utilized). The foregoing variables are preferably adjusted to that the material being applied is distributed from the distributor heads in the form of discrete globules to form a uniform pattern on the ground as is depicted in FIGURE 11.

As shown in that figure, the slurry is dispersed in individual globules in a very uniform manner with the globules covering a major portion of the total area of treated soil. It has been found that these globules spread and soak into the soil so that with subsequent rain, snow, thaw or tilling, the ingredients penetrate into the soil to provide a very thorough and complete nutrient supply. Further, through the use of this globular type of distribution, drifting difficulties are almost completely eliminated and the globules stick to the soil much like ink to a blotter so that there is no drifting even in heavy winds after the soil treating material is on the soil.

Figure 10:
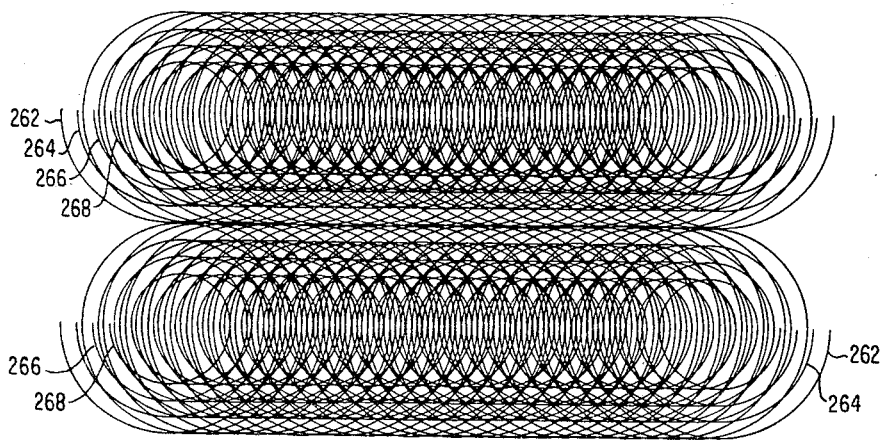
FIGURE 10 is a plan view similar to that of FIGURE 8 of the soil after treatment with the distributor conduits or pipes set at different angles to produce a more uniform application of the material.

When using the apparatus of FIGURE 1 in applying fertilizer to a corn field, it is preferred to use a total swath or pattern width of about thirty-four feet as that affords coverage of ten corn rows according to present-day planting techniques. To this end, the distributor heads 14 are spaced 17 feet apart each about eight and one-half feet from the center of the vehicle and the adjustable end pipes 74 are adjusted so that the two distributor heads create substantially equal diameter outer circular patterns of seventeen feet in diameter, the circular patterns being contiguous at the center of the truck. The other distributor pipes in each unit are set to produce smaller diameter circles as described in connection with FIGURES 9 and 10 to get uniform distribution. It is also a feature of the invention, that the booms are sufficiently to the rear of the wheels of the truck, or, alternatively, the booms are disposed diagonally back from the truck so that the rear wheels of the truck do not intercept the pattern and thereby destroy its uniformity and waste fertilizer material.

As the truck is advanced over a field, the slurry is discharged from the distributor heads at a flow rate proportioned to the speed of the vehicle to supply a preselected flow rate of slurry to each acre of land in the field. The range of application may be as low as one hundred pounds or as much as one thousand pounds per acre. In average field operations, the truck traveling at ten miles an hour and spreading at the rate of six hundred pounds per acre (allowing fill time) will spread twenty acres per hour. At a lesser rate of application, up to twenty-five to thirty acres per hour may be accomplished. One of the advantages of the method and apparatus is that, since the area of broadcasting is not basically dependent upon the hydrostatic pressure or rate of flow of the slurry, the pounds per acre may be varied by increasing or decreasing the recirculation rate and/or the orifice sizes without causing any substantial overlap of the contiguous circular patterns.

By performance of the foregoing steps, and operation of the apparatus in the manner described, viscous slurries can be spread uniformly and at any desired rate to provide the advantages of economy (both in fertilizer composition and in spreading charges), speed, convenience (since fertilizer may be spread almost anytime of the year) and minimum travel over a field (since "one-shot" applications are practical with the device of the invention).

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An apparatus for applying soil treating materials and adapted to be mounted in a container for said materials, said apparatus comprising a substantially vertical shaft, a pump impeller at the lower portion of said shaft, mixing means carried by said shaft immediately above said impeller at the lower portion thereof, support means about said shaft, bearing means rotatably mounting said shaft to said support means, and means preventing said treating materials from reaching said bearing means including means extending about said shaft and enclosing said bearing means and compressible sealing means about said shaft between said enclosing and mixing means.

2. An apparatus as set out in claim 1 wherein said mixing means comprise a plurality of flat plates having apertures therein.

3. An apparatus as set out in claim 2 wherein said plates are circular and are parallel to one another.

4. An apparatus as set out in claim 3 wherein the apertures in said plurality of plates are aligned.

5. An apparatus as set out in claim 1 wherein said support means comprises a tube surrounding said vertical shaft with bearing means between said tube and said shaft.

6. An apparatus for applying soil treating materials and adapted to be mounted in a container for said materials, said apparatus comprising a substantially vertical shaft, a pump impeller at the lower portion of said shaft, mixing means carried by said shaft above said impeller at the lower portion thereof, support means about said shaft, bearing means rotatably mounting said shaft to said support means, and means preventing said treating materials from reaching said bearing means, said support means comprising a tube surrounding said vertical shaft with bearing means between said tube and said shaft, and a second tube disposed about the first named tube and having bearing means between said second and first tubes.

7. An apparatus as set out in claim 6 wherein said mixing means are carried by said second tube.

8. An apparatus as set out in claim 7 including a sealing means clamped between the mixing means and said second tube.

9. An apparatus as set out in claim 8 wherein said mixing means comprises at least one plate attached to said shaft, said second tube having a flange at its lower end, and a resilient sealing means disposed about said shaft and compressed between said plate and said flange.

10. An apparatus as set out in claim 9 including a third tube disposed about the upper end of said second tube.

11. An apparatus as set out in claim 10 wherein said plate is attached to said flange.

12. An apparatus as set out in claim 11 including a second plate parallel to and in close proximity to said first plate, both said plates being apertured and attached to said flange.

13. An apparatus as set out in claim 1 including a lower mounting plate above said impeller, an impeller enclosure attached to said mounting plate and extending below said impeller, said mounting plate and enclosure forming a pump chamber, said pump chamber having suction and discharge passages, a pair of circular mixing plates disposed above said mounting plate substantially parallel thereto, said mixing plates having apertures therein.

14. An apparatus for applying soil treating materials and adapted to be mounted in a container for said materials, said apparatus comprising a substantially vertical shaft, a pump impeller at the lower portion of said shaft, mixing means carried by said shaft above said impeller at the lower portion thereof, support means about said shaft, bearing means rotatably mounting said shaft to said support means, means preventing said treating materials from reaching said bearing means, a lower mounting plate above said impeller, an impeller enclosure attached to said mounting plate and extending below said impeller, said mounting plate and enclosure forming a pump chamber, said pump chamber having suction and discharge passages, a pair of circular mixing plates disposed above said mounting plate substantially parallel thereto, said mixing plates having apertures therein, and an upper mounting plate disposed about the upper end of said shaft, said support means comprising a first tube attached to said upper mounting plate and extending downwardly about said shaft, bearing means between said shaft and said first tube, a second tube disposed about said first tube, bearing means between said first and second tubes, sealing means between the lower end of said second tube and said shaft.

15. An apparatus as set out in claim 14 wherein said sealing means is clamped between a flange on the lower end of said second tube and the uppermost of said plate, said plates being supported from said flange.

16. An apparatus as set out in claim 15 including a third tube means extending downwardly from said upper mounting plate about said second tube means.

References Cited

UNITED STATES PATENTS

| | | | |
|---|---|---|---|
| 2,775,348 | 12/1956 | Williams | 103—111.1 |
| 2,984,462 | 5/1961 | O'Connor | 259—107 |

FOREIGN PATENTS

| | | |
|---|---|---|
| 68,610 | 2/1949 | Denmark. |

ROBERT W. JENKINS, *Primary Examiner.*